US006560847B2

(12) United States Patent
Ohlsson

(10) Patent No.: US 6,560,847 B2
(45) Date of Patent: *May 13, 2003

(54) METHOD FOR BILL-POSTING AND SYSTEM ADAPTED FOR SAID METHOD

(75) Inventor: Jan Ohlsson, Jarfalla (SE)

(73) Assignee: SCA Packaging Sweden AB, Norrkoping (SE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/408,344

(22) Filed: Sep. 29, 1999

(65) Prior Publication Data

US 2002/0002769 A1 Jan. 10, 2002

Related U.S. Application Data

(63) Continuation of application No. PCT/SE98/00545, filed on Mar. 26, 1998.

(30) Foreign Application Priority Data

Apr. 7, 1997 (SE) .............................................. 9701269

(51) Int. Cl.[7] ................................................ B23P 11/00

(52) U.S. Cl. ........................ 29/525.01; 40/649; 40/766; 40/793

(58) Field of Search ......................... 29/525.01; 40/766, 40/767, 763, 649, 765, 718, 790, 792, 793, 603, 709, 777, 779

(56) References Cited

U.S. PATENT DOCUMENTS

| | | | | | |
|---|---|---|---|---|---|
| 2,124,025 | A | * | 7/1938 | Braun | 40/642.02 |
| 2,981,018 | A | * | 4/1961 | Hopp et al. | 40/652 |
| 3,310,901 | A | * | 3/1967 | Sarkisian | 40/793 |
| 3,319,369 | A | * | 5/1967 | Severson | 40/654.01 |
| 3,827,169 | A | * | 8/1974 | Chase et al. | 40/624 |
| 4,145,828 | A | * | 3/1979 | Hillstrom | 40/793 |
| 4,185,408 | A | * | 1/1980 | Tracy | 40/564 |
| 4,362,591 | A | * | 12/1982 | Tracy | 156/300 |
| 4,498,255 | A | * | 2/1985 | Heard | 40/793 |
| 4,512,094 | A | * | 4/1985 | Seely | 40/793 |
| 4,512,095 | A | * | 4/1985 | Seely | 40/793 |
| 4,523,400 | A | * | 6/1985 | Seely | 40/793 |
| 4,711,347 | A | * | 12/1987 | Drexler et al. | 206/38 |
| 4,729,183 | A | | 3/1988 | Tarter et al. | |
| 4,751,115 | A | * | 6/1988 | Smith et al. | 428/12 |
| 4,756,107 | A | * | 7/1988 | Hillstrom | 40/603 |
| 4,794,712 | A | | 1/1989 | Wood | |
| 4,823,489 | A | | 4/1989 | Cea | |
| 4,937,959 | A | * | 7/1990 | Palmer et al. | 40/647 |

(List continued on next page.)

FOREIGN PATENT DOCUMENTS

| | | |
|---|---|---|
| DE | 195 06 049 | 11/1995 |
| FR | 2218042 | 8/1974 |
| GB | 2291672 | 1/1996 |
| SE | 7511636-8 | 1/1978 |
| WO | 92/16928 | 10/1992 |

*Primary Examiner*—Gregory Vidovich
*Assistant Examiner*—Essama Omgba
(74) *Attorney, Agent, or Firm*—Altera Law Group, LLC

(57) ABSTRACT

The present invention relates to a method of placarding which is characterized in that at least one sheet (1, 1*b*), preferably of corrugated cardboard, is provided with printed matter on at least one side. It is thereafter provided with at least one score/groove (2) crossing the sheet, about which it is thereafter folded up into an easily transportable unit. At a placarding site the sheet (1, 1*b*) is then unfolded to its full size and applied in a holder (3, 3*b*) specially intended for this. The said holder is made to retain the sheet (1, 1*b*) in that at least one part of an edge area of the sheet is enclosed by the holder (3, 3*b*). The invention also relates to a system of placarding adapted to this method.

7 Claims, 5 Drawing Sheets

U.S. PATENT DOCUMENTS 4,958,458 A * 9/1990 Hillstrom ..................... 40/793
5,046,543 A * 9/1991 Levy ......................... 160/84.1
5,234,231 A * 8/1993 Hollander et al. ............. 281/2
5,265,362 A * 11/1993 Yamaguchi .................. 40/603
5,307,575 A * 5/1994 Ivansson et al. .............. 40/793
5,442,873 A * 8/1995 Vogler ......................... 40/649
5,470,301 A * 11/1995 Brunt, II .................... 493/323
5,471,775 A * 12/1995 Hoyt et al. ................... 40/601
5,613,614 A 3/1997 Leverenz et al.
5,701,697 A * 12/1997 Komamura .................. 40/791
5,732,496 A * 3/1998 Tanaka ........................ 40/784
5,815,971 A * 10/1998 Rothe et al. .................. 40/718
5,881,484 A * 3/1999 Carroll ........................ 40/649
5,926,986 A * 7/1999 Dingle ........................ 40/792
5,930,928 A * 8/1999 Kantola et al. ............... 40/793
6,098,328 A * 8/2000 Belfiglio et al. .............. 40/658

* cited by examiner

METHOD FOR BILL-POSTING AND SYSTEM ADAPTED FOR SAID METHOD

This is a continuation of PCT/SE98/00545 filed Mar. 26, 1998.

FIELD OF THE INVENTION

The present invention relates to a method of placarding and a system of placarding adapted to the method.

DESCRIPTION OF THE RELATED ART.

Putting up advertising placards by pasting thin sheets of printed paper on to a surface intended for placarding is known. Standard methods of putting up large placards generally involve pasting a plurality of smaller sheets of paper which are made to carry a part of an advertising message, onto the placarding surface, so as to match up the design. This is a time-consuming method that requires great skill on the part of those pasting up the placards. Applying large advertising placards in this way also often results in unsuitable working positions, which may give rise to industrial injuries and mean that those carrying out the placarding have to do this from a ladder or the like. The relatively large amount of time spent also means that those pasting up the placards alongside a traffic route or a railway track are exposed to a further element of risk during this time. With renewed placarding on the same placarding surface, the placard layers accumulate one on top of another, which means that the placarding surface gradually comes to carry a considerable weight and therefore, in order not to overload the surface, the placarding surface has to be cleaned by tearing off the layers of placard. The accumulation of placard layers can also result in uneven and hence aesthetically unappealing surfaces, which can also make it more difficult to match up designs. It is also in the nature of the method that replacarding is rendered more difficult or impossible in very cold or damp weather. It is not possible at present to recycle the placard sheets owing to the adhesive generally used and the difficulty of removing the placards from the placarding surface.

SUMMARY OF THE INVENTION

According to one embodiment of the present invention a method of placarding is produced which has the advantages specified below compared to the known method described above.

The invention also produces a system of placarding intended for the method according to the present invention which has advantages specified below compared to the known system of placarding described above.

Preferred embodiments of the method and the system of placarding intended for this also have any or some of the characteristics specified in respective subordinate claims.

The method according to the invention and the products produced by the said method have several advantages:

Using the method and the system according to the invention, replacarding can be done rapidly by means of simple operations and performed by unskilled personnel.

By using the method and the system of placarding according to the invention, stands for display surfaces do not need to be designed to support the accumulated weight of a plurality of placard layers.

The method and the system according to the invention allow replacarding to be carried out regardless of temperature and damp weather conditions.

The method and the system according to the invention also allow the placarding material to be re-used and, where this is collected, complete recycling thereof, thereby achieving great environmental advantages.

The method and system of placarding according to the invention also allow the placarding surface to be used for a permanent advertising message, when placarding is not continuous.

Furthermore, the method and the system according to the invention allow the placard sheets to be arranged so as to support or to simulate three-dimensional surfaces.

The majority of placarding surfaces intended for placarding in the known manner can easily be adapted for placarding by the method and the system according to the invention.

The invention will be explained in more detail below with the aid of an example of an embodiment of the method of placarding according to the present invention and the system of placarding intended for this, and with reference to the drawings attached in which:

DETAILED DESCRIPTION OF THE INVENTION

Figure 1:
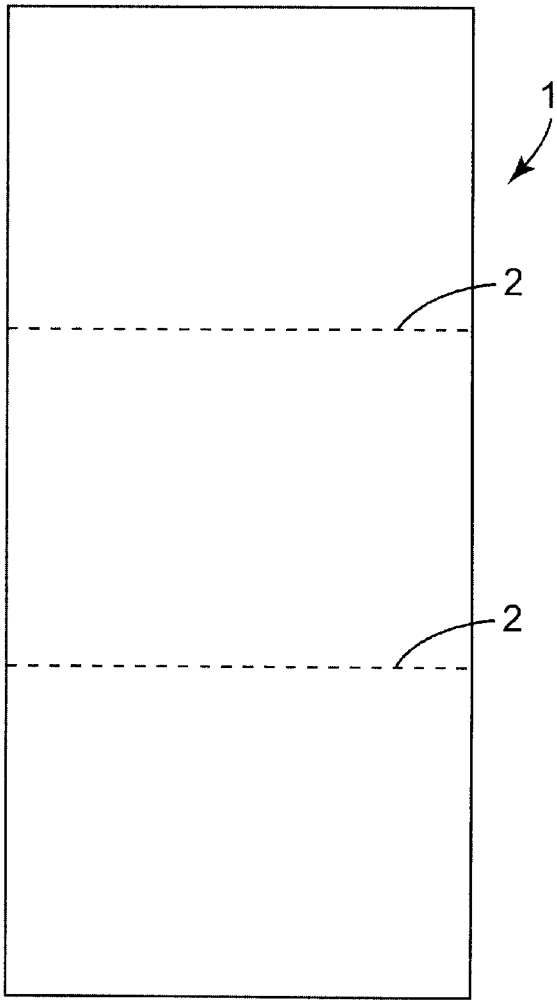
FIG. 1 shows a sheet according to a first embodiment of the present invention.

The sheet 1 according to a first embodiment of the present invention shown in FIG. 1 is suitably made of corrugated cardboard or some similar material. The sheet 1 is intended to be provided with printed advertising matter on at least one side. The surface of the sheet 1 is preferably provided with a layer acting as moisture barrier. This layer preferably allows the sheet to be recycled without first having to remove the layer. The sheet 1 furthermore has two scores/grooves 2 extending across it, about which it is adapted to be folded up into an easily transportable unit. The scores/grooves 2 are preferably formed parallel to the sheet flute tubes. The sheet 1 may, for example, be of the usual size for placarding of 3000×1400 mm or some other arbitrary size.

Figure 2:
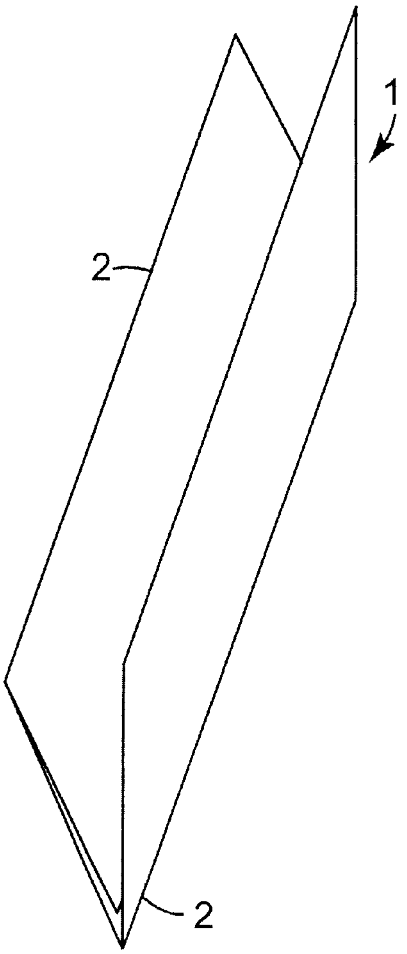
FIG. 2 illustrates the method of folding up the sheet according to FIG. 1 into an easily transportable unit.

FIG. 2 shows how the sheet according to FIG. 1, can be folded up about its scores/grooves 2 crossing the sheet into an easily transportable unit, for transport to an advertising company depot or a placarding site. Because the sheet 1 can be folded up in this way, even large sheets can be easily transported in a standard vehicle.

Figure 3B:
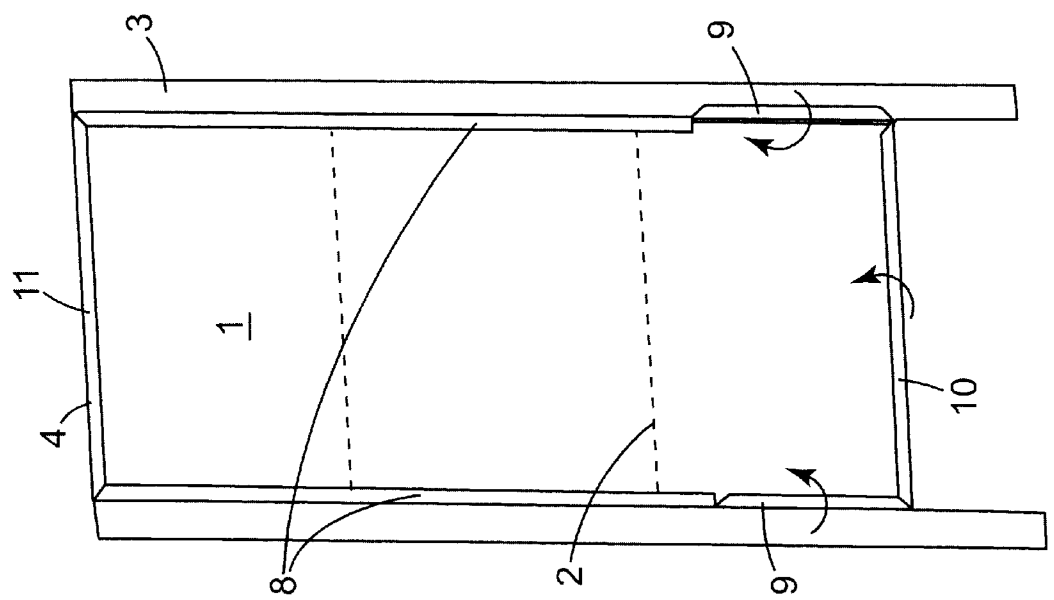
FIG. 3*b* shows how the sheet according to FIG. 3*a* can be fastened to the holder.
Figure 3A:
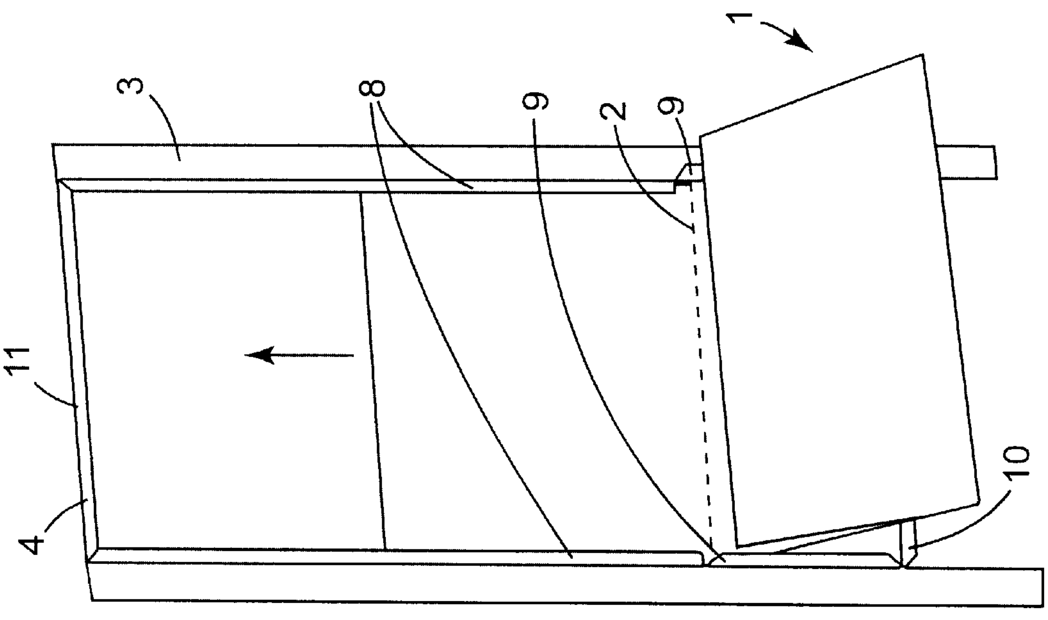
FIG. 3*a* illustrates application of the sheet according to FIG. 1 in a holder specially intended therefor.

It will be seen from FIG. 3*a* how the sheet 1, according to FIG. 1, after transport to a placarding site in the folded state, according to FIG. 2, can be unfolded and placed in a holder 3 specifically intended for holding the sheet 1. The holder 3, as shown in the figure, for example, can be designed with a frame 4 corresponding to the periphery of the holder 3 and the sheet 1 to be displayed therein. The frame 4 is provided with a top horizontal slot 11 adapted to receive and enclose a top edge of the sheet 1 and two vertical opposing longitudinal side slots 8 which are adapted to receive, enclose and engage the side edges of the sheet 1. The vertical opposing longitudinal side slots 8 extend along a substantial upper portion of the longitudinal sides of the holder 3, as shown in FIG. 3*a*.

The frame 4 also includes two openable longitudinal side slots 9. The two openable longitudinal side slots 9 are adapted to provide a side opening in the frame 4 for facilitating insertion of the sheet 1 therein. The openable side slots 9 are adapted to engage the sheet 1 in the holder 3 when closed upon the sheet. The openable side slots 9 and vertical longitudinal side slots 8 together form the entirety of the side slots of the frame 4. The frame 4 also includes a bottom openable horizontal slot 10 which, when opened, provides a bottom opening for insertion of a sheet 1 into the holder 3 and which, when closed upon the sheet 1, engages the sheet 1 in the holder 3.

In use, the frame 4 of the holder 3 is opened at one end by opening the openable longitudinal side slots 9 and the bottom openable horizontal slot 10. The sheet 1 is then pushed and inserted into the opposing longitudinal side slots 8. Once the sheet 1 is fully seated in the longitudinal side slots 8 of the frame 4, the openable longitudinal slots 9 are closed around the free edge of the sheet 1 and the bottom openable horizontal slot 10 is closed around the free bottom edge of the sheet 1, as illustrated in FIG. 3*b*, securing the sheet 1 in the holder 3.

Pushing the sheet 1 into the longitudinal side slots 8 until it engages the top horizontal slot 11 in the frame 4 of the holder 3 also prevents water from getting into the flute tubes and adversely affecting the characteristics of the sheet 1. The sheet 1 is preferably applied in the holder 3 so that the sheet's flute tubes are oriented horizontally to prevent water from being conducted through the flute tubes.

Figure 4:
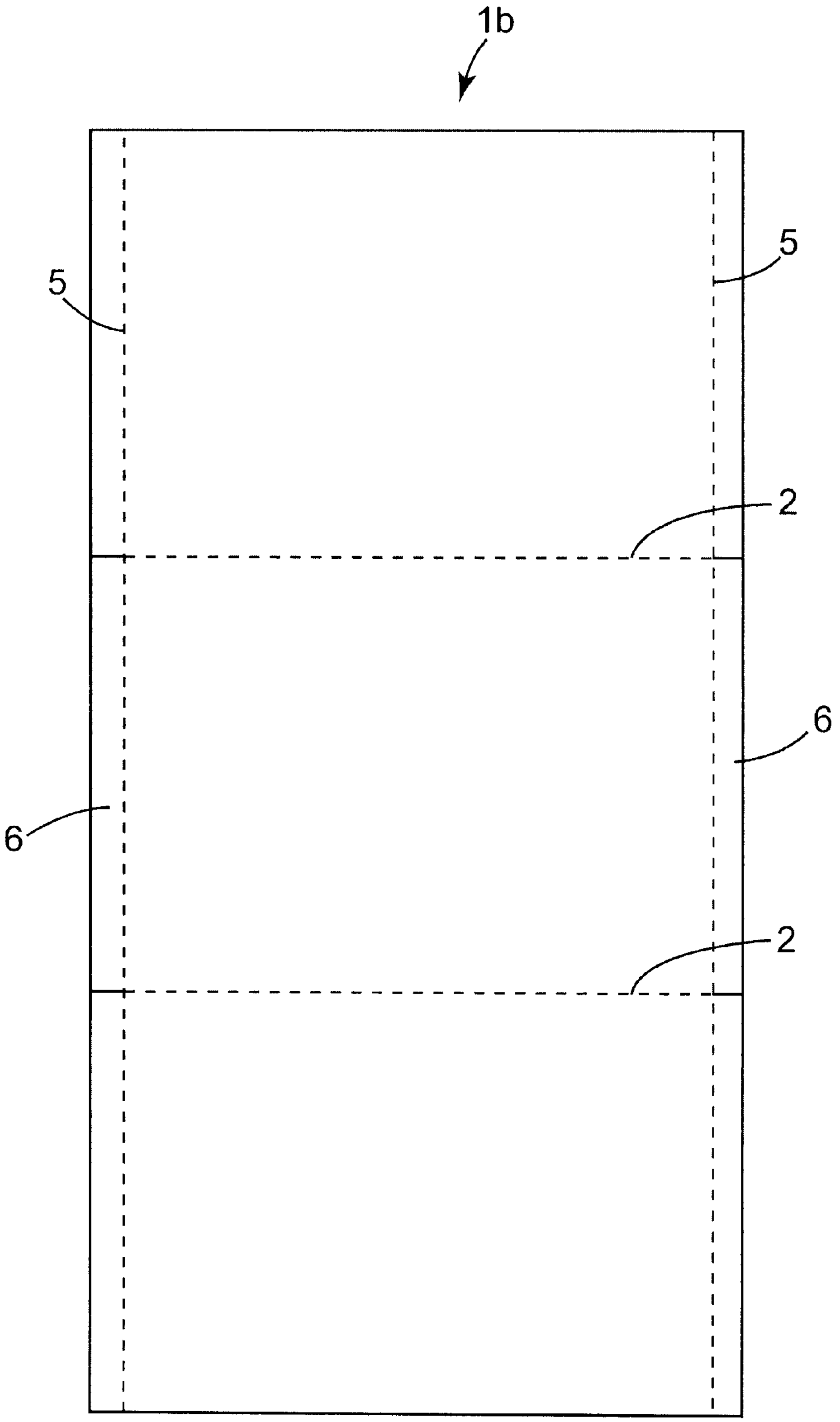
FIG. 4 shows a sheet according to a second embodiment of the present invention

FIG. 4 shows a sheet 1*b* of corrugated cardboard according to a second embodiment of the present invention. The said sheet 1*b* is preferably intended to be used together with one or more similar sheets, each carrying a printed section. In order to permit application with matching of the design between the printed sections, the sheet 1*b*, in addition to the characteristic features as specified in the description of the first embodiment according to FIG. 1, is also provided with at least two essentially parallel scores/grooves 5, each defining two elongated opposing edge areas of the sheet 6. The printed section of each sheet 1*b* is formed between the elongated edge areas 6 on at least one side of the sheet 1*b*.

Figure 5A:
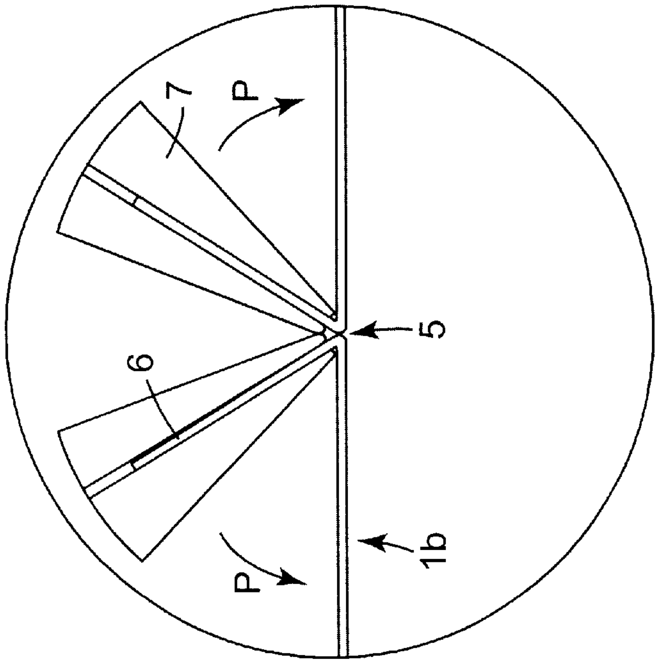
FIG. 5*a* shows a partial enlargement of the fastening circled in FIG. 5
Figure 5:
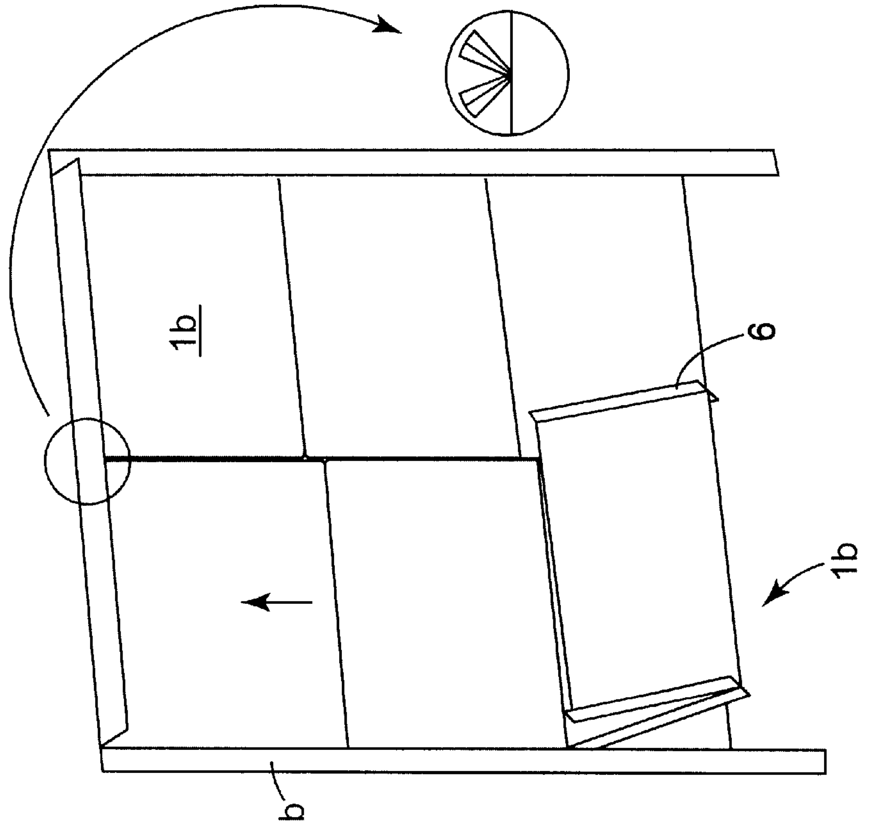
FIG. 5 illustrates the application of matching the design of two sheets provided with printed sections according to FIG. 4 in a special holder intended therefor

As will be seen from FIG. 5, two sheets 1*b* provided with printed sections are adapted to form a complete placarding image in that the elongated edge areas 6 are folded so that they form angles with the printed surface of the sheet. The sheets 1*b* are then applied so that a score/groove 5 defining an elongated edge area on each sheet is fixed parallel side by side thereby matching the design between the printed sections in a holder 3*b* specially intended for the sheets. The holder 3*b* is adapted to retain the sheets 1*b* in that at least part of their elongated edge areas 6 is enclosed by the rim of the holder 3*b*. The sheets 11*b*, as shown, for example, in the detached circle in FIG. 5, are fixed behind the placarding surface at their respective elongated folded-in edge areas 6, and this affords them protection against moisture, whilst fixing them behind the placarding surface means that the sheets 1*b* can be applied in such a way that the printed sections can essentially adjoin one another.

FIG. 5*a* shows, by means of a partial enlargement of the content of the detached circle in FIG. 5, how the sheets 1*b* can be fixed behind the placarding surface so that a score/groove 5 defining an elongated edge area 6 on each sheet 1*b* can be fixed parallel so as to match the design between the sections. To achieve this the elongated edge areas of the sheets are folded to form angles with the printed surfaces of the sheets and are then inserted into the fastening devices 7 located in the position shown in FIG. 5*a*. The fastening devices are then twisted in the direction as indicated by the arrows P and locked, which results in the sheets 1*b* being put under tension and thus fixed by the holder 3*b*.

Figure 6:
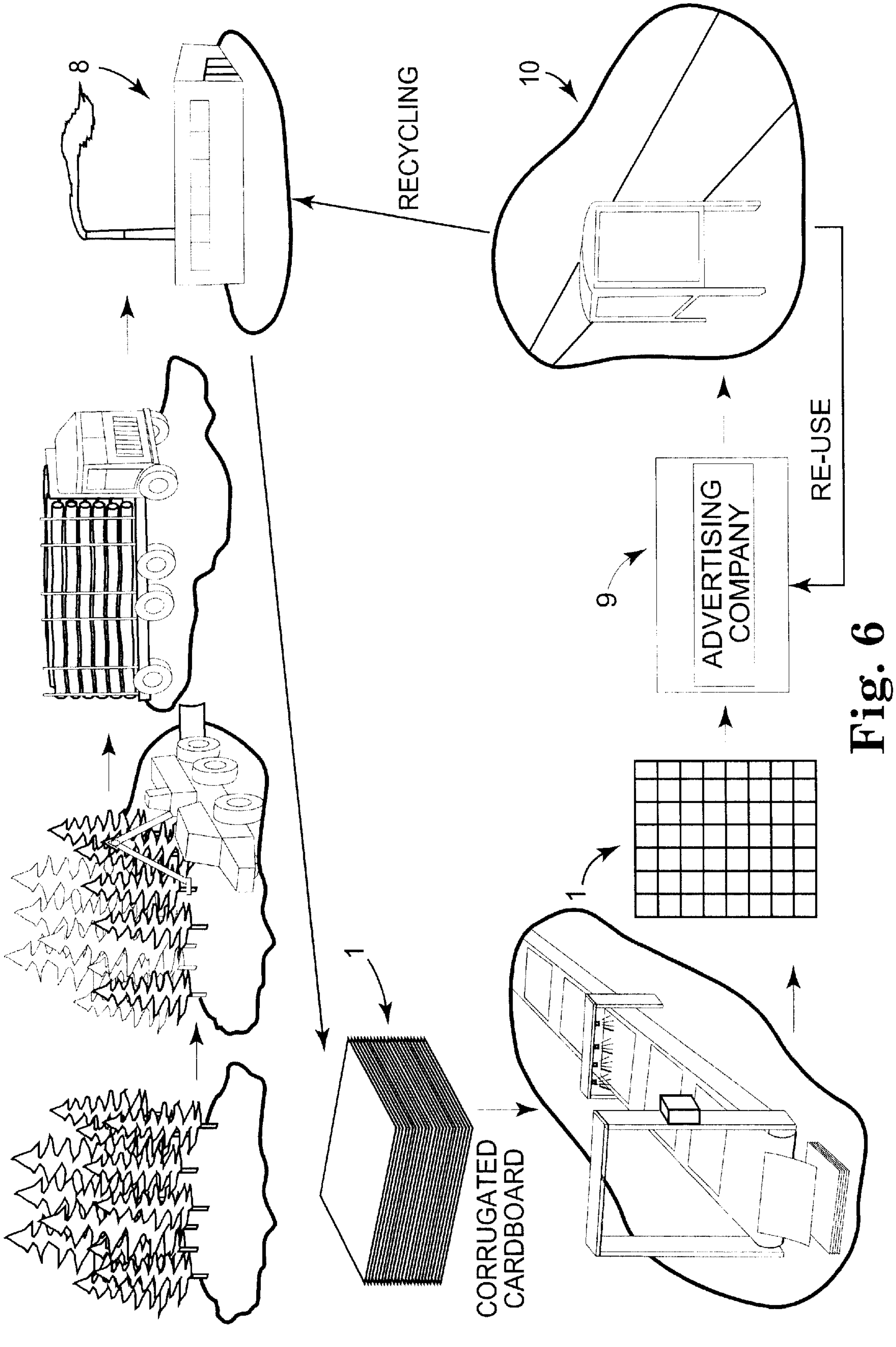
FIG. 6 illustrates, in diagrammatic form, how the method and the system according to the present invention permit re-use and recycling of the placard sheets.

FIG. 6 shows in diagrammatic form how the method and the system according to the present invention permit re-using and recycling of the placard sheets 1, 1*b*. The sheets 1, 1*b* are manufactured conventionally from raw timber material which is cut and transported to a manufacturing plant 8, and recycled material. Following this the sheets are provided with advertising printed matter, a layer acting as moisture barrier and the scores/grooves 2, 5 that are required in order to allow the sheet 1, 1*b* to be folded up into an easily transportable unit. The folded sheet 1, 1*b* is then transported to an advertising company depot 9, from where it is transported to the placarding site 10 when it is time for the advertising campaign. At the placarding site the sheet is unfolded and applied in a holder 3 specially intended for the sheets. After its use at the placarding site 10 the sheet can be released from the holder 3, 3*b* and thereafter folded up again into the easily transportable unit and transported back to the advertising company depot 9. There it can then be stored before once again being transported to the same site or to a new placarding site 10, where the sheet 1, 1*b* is again unfolded to its full size and applied in a holder 3, 3*b* specially intended for this, for a repeat advertising campaign. On conclusion of placarding, the sheet 1, 1*b* is removed from the holder 3, 3*b*, folded up and transported to a recycling plant 9 for recycling. It is also possible to re-use the sheet 1, 1*b* by providing it with printed matter on both sides and, after its use at the placarding site 10 at which one of its sides was displayed, the sheet can be released from the holder 3, 3*b*, turned and placed back in the holder again so that its other side is now displayed.

It will be obvious to a person skilled in the art that the method of the invention is not confined to the embodiments described above, but can rather lend itself to modifications within the scope of the idea of the invention defined in the claims below. Thus, for example, the sheet may be made of any material with similar characteristics, and the person skilled in the art will moreover realise that the holders for the sheets may be made in many different ways. Furthermore the sheets, because of their relative rigidity, can also easily be adapted to carry further formed elements provided with printed sections, the said forms, for example, possibly resembling elements in the advertising message to be communicated. Alternatively the sheet itself may be adapted to permit application in the holder so that it assumes a form other than the entirely plane form.

What is claimed is:

1. A method of placarding comprising:

inserting a first end of at least one placard sheet into an opening in a receiving end of a placard display holder, the opening including an openable end slot and a pair of opposing openable side slots;

pushing the sheet into longitudinal side slots extending along a substantial portion of opposing edges of the holder, the longitudinal side slots receiving and holding the sheet in place; and closing the openable end slot and closing the openable side slots to engagingly retain the sheet in the holder, the openable side slots and the longitudinal side slots together extending along a length of opposing edges of the holder and engaging the sheet, wherein the sheet has an image on at least one side and at least one joint crossing the sheet about which the sheet can be folded into an easily transportable unit, wherein a portion of an edge area of the sheet is enclosed by the holder.

2. The method according to claim 1, wherein the sheet comprises a layer acting as moisture barrier on at least one side thereof.

3. The method according to claim 1, wherein the at least one placard sheet comprises two placard sheets and each sheet has an image between elongated opposing edge areas of the sheet and the method further comprising:

folding each sheet at edge joints to form angles with an image surface of the sheet, the edge joints being fixed parallel and side by side with a matching image of an adjacent sheet; and retaining the sheets in the holder, wherein at least a portion of each sheet's elongated edge area is enclosed by the holder.

4. The method according to claim 1, wherein the sheet includes an image on both sides thereof to allow each side to be displayed.

5. The method according to claim 1, further comprising;

removing the sheet from the holder;

folding the sheet into an easily transportable unit;

transporting the sheet to a storage location;

storing the folded sheet;

transporting the sheet to another placarding site; and inserting the sheet into another placard holder.

6. The method according to claim 1, further comprising, attaching at least one formed element to the image to produce a three-dimensional impression when the sheet is inserted in the holder.

7. The method according to claim 6, further comprising, inserting the sheet into the holder wherein the sheet is non-planar.

* * * * *